(12) United States Patent
Shuman et al.

(10) Patent No.: US 11,080,993 B1
(45) Date of Patent: Aug. 3, 2021

(54) VEHICLE TO EVERYTHING COMMUNICATION MANAGEMENT ACCORDING TO A VULNERABLE ROADSIDE USER DEVICE CONFIGURATION

(71) Applicant: QUALCOMM Incorporated, San Diego, CA (US)

(72) Inventors: Mohammed Ataur Rahman Shuman, San Diego, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/831,067

(22) Filed: Mar. 26, 2020

(51) Int. Cl.
*G08G 1/005* (2006.01)
*G08G 1/01* (2006.01)
(Continued)

(52) U.S. Cl.
CPC .............. *G08G 1/005* (2013.01); *G06F 1/163* (2013.01); *G06F 3/016* (2013.01); *G06F 3/167* (2013.01);
(Continued)

(58) Field of Classification Search
CPC .............. H04M 3/4931; H04M 3/4933; H04M 3/4935; H04M 15/06; H04M 3/42068; H04M 15/00; H04M 15/41; H04M 15/44; H04M 15/51; H04M 15/58; H04M 15/68; H04M 15/80; H04M 15/8038; H04M 15/8044; H04M 15/8228; H04M 2203/6009; H04M 2207/18; H04M 2207/206; H04M 2215/01; H04M 2215/0104; H04M 2215/0152; H04M 2215/0164; H04M 2215/0188; H04M 2215/0196; H04M 2215/2026; H04M 2215/32; H04M 2215/34; H04M 2215/42; H04M 2215/54; H04M 2215/74; H04M 2215/7442; H04M 2215/745; H04M 2215/7833; H04M 3/42008; H04M 3/42042; H04M 3/4211; H04M 3/42153; H04M 3/51; H04M 3/493; H04M 15/8033; H04M 2201/38; H04M 2203/2061; H04M 2207/20; H04M 2215/7435; H04M 2242/30; H04M 3/12; H04M 3/42102; H04M 3/436; H04M 3/5166; H04M 3/5183; H04M 3/5237; H04M 7/0036;
(Continued)

(56) References Cited

U.S. PATENT DOCUMENTS 9,160,866 B1 * 10/2015 Keiser .................. H04M 15/56
2011/0270661 A1 * 11/2011 Heiser, II ............ G06F 16/9535
705/14.25

(Continued)

*Primary Examiner* — Daniel Previl
(74) *Attorney, Agent, or Firm* — Harrity & Harrity, LLP (57) ABSTRACT

Various aspects of the present disclosure generally relate to wireless communication. In some aspects, a device may receive a vehicle to everything (V2X) communication associated with a vehicle in an environment; determine, based at least in part on a vulnerability measure of a vulnerable roadside user (VRU) in the environment, a VRU notification profile associated with whether an alert is to be provided to a VRU to indicate vehicle data of the vehicle; and perform an action according to the VRU notification profile. Numerous other aspects are provided.

30 Claims, 7 Drawing Sheets

(51) Int. Cl.
<table>
<tr><td>G08G 1/16</td><td>(2006.01)</td></tr>
<tr><td>G08B 21/02</td><td>(2006.01)</td></tr>
<tr><td>H04W 4/40</td><td>(2018.01)</td></tr>
<tr><td>G06F 3/01</td><td>(2006.01)</td></tr>
<tr><td>G06F 3/16</td><td>(2006.01)</td></tr>
<tr><td>G07C 5/00</td><td>(2006.01)</td></tr>
<tr><td>H04W 4/02</td><td>(2018.01)</td></tr>
<tr><td>G06F 1/16</td><td>(2006.01)</td></tr>
</table>

(52) U.S. Cl.
CPC ............ *G07C 5/008* (2013.01); *G08B 21/02* (2013.01); *G08G 1/0116* (2013.01); *G08G 1/166* (2013.01); *H04W 4/023* (2013.01); *H04W 4/40* (2018.02)

(58) Field of Classification Search
CPC .... H04M 7/0045; H04M 7/0048; H04M 7/06; H04M 7/12; H04M 7/1235; H04M 7/1295; H04M 3/38; H04M 3/385; H04M 3/42136; H04M 3/42221; H04M 15/56; H04M 15/8083; H04M 17/35; H04M 2215/0192; H04M 3/4228; H04M 3/4285; H04M 3/4878; H04M 7/0012; H04M 7/006; H04M 17/00; H04M 2250/58; H04M 3/4936; H04W 40/02; H04W 4/00; H04W 4/12; H04W 4/16; H04W 4/24; H04W 56/00; H04W 74/00; H04W 8/02; H04W 4/40; H04W 4/80; H04W 48/20; H04W 4/70; H04W 4/90; H04W 52/0216; H04W 52/0219; H04W 60/04; H04W 76/10; H04W 76/14; H04W 76/27; H04W 4/027; H04W 84/12; G06Q 30/02; G06Q 10/00; G06Q 10/0631; G06Q 10/06311; G06Q 10/083; G06Q 10/0833; G06Q 10/1095; G06Q 30/016; G06Q 30/0203; G06Q 30/0282; G06Q 40/02; G06Q 20/305; G06Q 20/40145; G06Q 20/04; G06Q 20/10; G06Q 20/12; G06Q 20/382; G06Q 20/40; G06Q 20/401; G06Q 20/4016; G06Q 30/0224; G06Q 30/0255; G06Q 30/0269; G06Q 40/00; G06Q 40/12; G06Q 90/00; G06Q 20/02; G06Q 20/102; G06Q 20/14; G06Q 30/04; G06Q 10/02; G06Q 10/06; G06Q 10/10; G06Q 10/107; G06Q 20/16; G06Q 20/24; G06Q 20/409; G08G 1/123; G08G 1/005; G08G 1/07; G08G 1/087; G08G 1/096791; G08G 1/096811; G08G 1/096822; G08G 1/096838; G08G 1/096883; G08G 1/163; G08G 1/164; G08G 1/166; H04Q 2213/13097; H04Q 2213/13103; H04Q 2213/13141; H04Q 2213/13376; H04Q 3/0029; G10L 17/00; G10L 17/06; G10L 15/22; G10L 17/22; G10L 19/018; G10L 21/32; G10L 16/9535; G10L 63/0876; G10L 67/12; G10L 45/00; G10L 45/22; G10L 47/122; G10L 49/201; Y02D 30/70; G01C 21/3415; G07C 9/38; H04B 1/3822
USPC ....... 340/944, 425.5, 435, 436, 901, 995.17, 340/995.13, 995.1
See application file for complete search history.

(56) References Cited

U.S. PATENT DOCUMENTS

<table>
<tr><td>2017/0092126 A1*</td><td>3/2017</td><td>Oshida</td><td>G08G 1/005</td></tr>
<tr><td>2018/0295481 A1*</td><td>10/2018</td><td>Kahtava</td><td>H04W 4/80</td></tr>
<tr><td>2019/0051151 A1*</td><td>2/2019</td><td>Mueck</td><td>B60W 50/14</td></tr>
<tr><td>2019/0059091 A1*</td><td>2/2019</td><td>Tang</td><td>H04W 72/08</td></tr>
<tr><td>2019/0059115 A1*</td><td>2/2019</td><td>Uchiyama</td><td>H04W 56/002</td></tr>
<tr><td>2019/0246385 A1*</td><td>8/2019</td><td>Lin</td><td>H04L 43/0876</td></tr>
<tr><td>2019/0373609 A1*</td><td>12/2019</td><td>Kim</td><td>H04W 36/06</td></tr>
</table>

* cited by examiner

VEHICLE TO EVERYTHING COMMUNICATION MANAGEMENT ACCORDING TO A VULNERABLE ROADSIDE USER DEVICE CONFIGURATION

FIELD OF THE DISCLOSURE

Aspects of the present disclosure generally relate to vehicle to everything (V2X) communication and to V2X communication management according to a vulnerable roadside user (VRU) device configuration.

BACKGROUND

A vehicle may include a sensor system that includes one or more sensors to determine characteristics associated with the vehicle and/or characteristics associated with an environment of the vehicle. For example, such a sensor system may be configured to detect proximity to an object, a weather condition, a road condition, a vehicle speed, a traffic condition, a location of the vehicle, and/or the like. A vehicle may share (e.g., using a vehicle to everything (V2X) communication, a vehicle to vehicle (V2V) communication, and/or the like) information associated with the sensor system and/or the vehicle with other vehicles, roadside units (RSUs), vulnerable roadside user (VRU) devices, and/or the like.

SUMMARY

In some aspects, a method, performed by a device, may include receiving a vehicle to everything (V2X) communication associated with a vehicle in an environment; determining, based at least in part on a vulnerability measure of a vulnerable roadside user (VRU) in the environment, a VRU notification profile associated with whether an alert is to be provided to a VRU to indicate vehicle data of the vehicle; and performing an action according to the VRU notification profile.

In some aspects, a device may include a memory and one or more processors operatively coupled to the memory. The memory and the one or more processors may be configured to receive a V2X communication associated with a vehicle in an environment; determine, based at least in part on a vulnerability measure of a VRU in the environment, a VRU notification profile associated with whether an alert is to be provided to a VRU to indicate vehicle data of the vehicle; and perform an action according to the VRU notification profile.

In some aspects, a non-transitory computer-readable medium may store one or more instructions for wireless communication. The one or more instructions, when executed by one or more processors of a device, may cause the one or more processors to receive a V2X communication associated with a vehicle in an environment; determine, based at least in part on a vulnerability measure of a VRU in the environment, a VRU notification profile associated with whether an alert is to be provided to a VRU to indicate vehicle data of the vehicle; and perform an action according to the VRU notification profile.

In some aspects, an apparatus for wireless communication may include means for receiving a V2X communication associated with a vehicle in an environment; means for determining, based at least in part on a vulnerability measure of a VRU in the environment, a VRU notification profile associated with whether an alert is to be provided to a VRU to indicate vehicle data of the vehicle; and means for performing an action according to the VRU notification profile.

Aspects generally include a method, apparatus, system, computer program product, non-transitory computer-readable medium, user device, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In some instances, vehicles (e.g., via electronic control units (ECUs) of vehicles, such as telematics control units (TCUs) and/or the like) may be configured to communicate with each other and/or other devices. For example, advances in communication technologies have enabled vehicle-to-everything (V2X) communication, which may include vehicle-to-vehicle (V2V) communication, vehicle-to-pedestrian (V2P) communication, and/or the like. Furthermore, one or more roadside units (RSUs) of a roadside platform may be utilized in association with V2X communication. For example, an RSU may be configured to facilitate communication between vehicles, receive information associated with and/or from vehicles traveling along a roadway, provide information to and/or associated with vehicles traveling along a roadway, and/or the like.

In some cases, vehicles and/or RSUs may be configured to share information, from V2X communications, with vulnerable roadside units (VRUs). For example, a V2X device (e.g., a vehicle, an RSU, and/or the like) may transmit vehicle information to a user device of a VRU (referred to herein as a "VRU device") to cause or permit the VRU device to use a user interface component to warn the VRU of the presence of the vehicle, indicate a location of the vehicle, provide information associated with the vehicle, and/or the like. However, in some instances, using certain user interface components (e.g., output components, such as a display, a speaker, a vibration mechanism, and/or the like) can be futile. For example, when a VRU device is in a pocket or an environment of the VRU is loud, the VRU may not see a display of the VRU device or hear a speaker of the VRU that is rendering information associated with the vehicle.

According to some aspects described herein, a VRU device performs V2X communication management according to a VRU device configuration. In some aspects, the VRU device may determine a VRU device configuration associated with a VRU and determine a VRU notification profile to notify (e.g., alert, warn, indicate, and/or the like) the VRU. The VRU device may determine the VRU device configuration by identifying any or all activatable output components associated with the VRU, including output components of the VRU device and other devices (e.g., wearable devices) communicatively coupled with the VRU device. The VRU notification profile may correspond to an optimal manner in which the VRU may receive vehicle information that is associated with the vehicle. More specifically, the VRU notification profile may identify which output components are to render certain outputs (e.g., according to a model or priority scheme described herein) based at least in part on the VRU device configuration and context information associated with the vehicle and/or the VRU. In this way, the VRU device may conserve computing resources (e.g., processing resources, memory resources, and/or the like), communication resources (e.g., short-range wireless communication resources between the VRU device and a wearable device), and/or power resources (e.g., power resources to activate an output component) associated with providing V2X-related notifications to a VRU, relative to previous techniques, by avoiding transmission and/or rendering V2X-related notifications that are not likely to be received by the VRU. Furthermore, the VRU device may enhance a user experience associated with receiving V2X-related notifications by determining and/or providing notifications that are more likely to be received by the VRU, relative to previous techniques.

Figure 1:
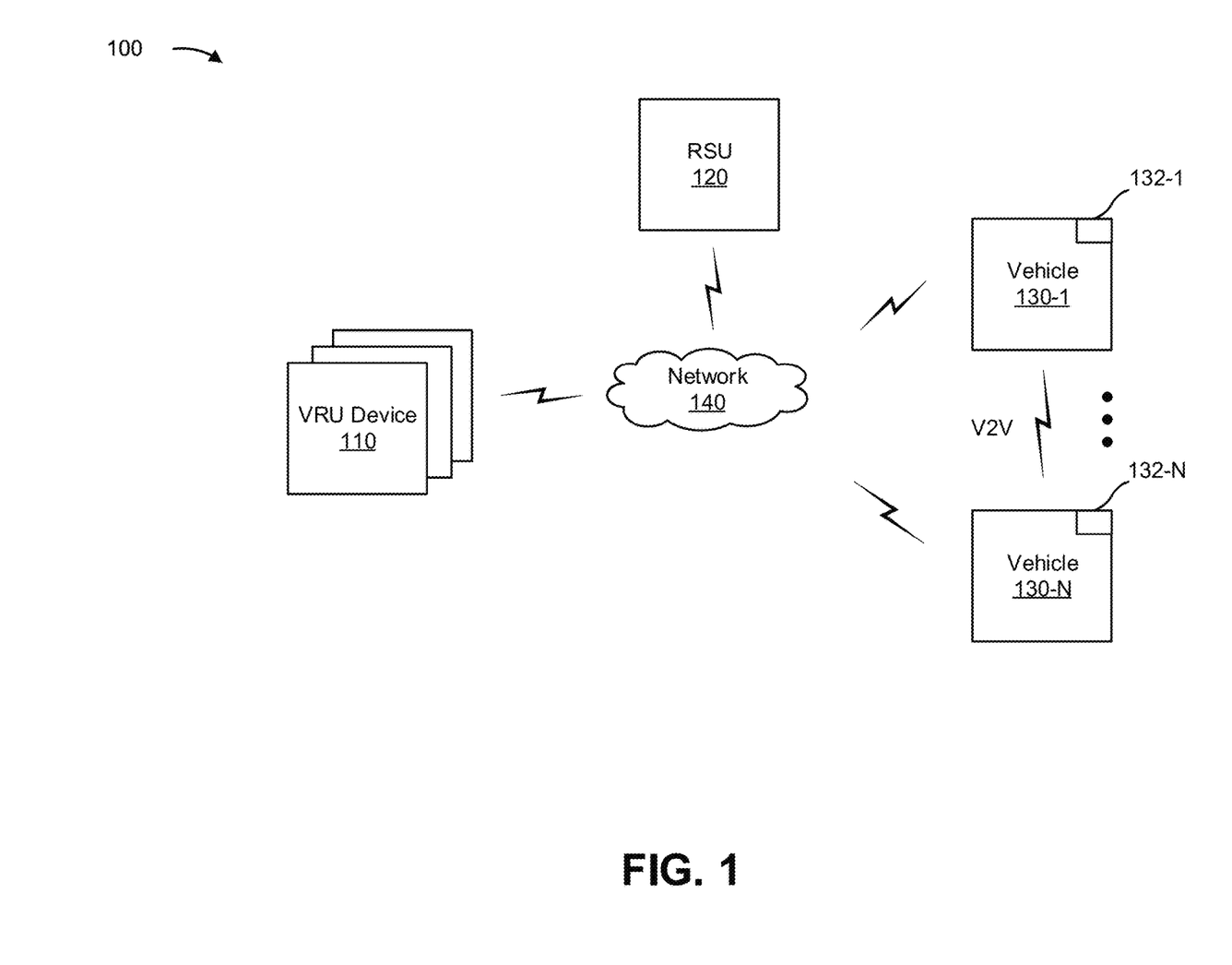
FIG. 1 is a diagram conceptually illustrating an example environment in which a vulnerable roadside unit (VRU) device described herein may be implemented, in accordance with various aspects of the present disclosure.

FIG. 1 is a diagram of an example environment 100 in which systems and/or methods described herein may be implemented. As shown in FIG. 1, environment 100 may include one or more VRU devices 110 (referred to herein individually as "VRU device 110", and collectively as "VRU devices 110"), an RSU 120, one or more vehicles 130-1 to 130-N (referred to individually as a "vehicle 130" and collectively as "vehicles 130") with corresponding ECUs 132-1 to 132-N (referred to individually as a "TCU 132" and collectively as "ECUs 132"), and a network 140. Although each of vehicles 130 is shown in FIG. 1 with a single corresponding TCU 132 (e.g., the TCU 132 is collocated with the vehicle), one or more vehicles 130 in environment 100 may include two or more ECUs 132. Devices of environment 100 may interconnect via wired connections, wireless connections, or a combination of wired and wireless connections.

VRU device 110 includes one or more devices capable of receiving, generating, storing, processing, transmitting, and/or providing information associated with V2X communication management, as described herein. For example, VRU device 110 may include a communication and/or computing device, such as a user equipment (UE) or a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device. VRU device 110 includes a V2X compatible and/or V2X device that is capable of communicating with other V2X devices, as described herein.

RSU 120 includes one or more computing devices and/or communication devices (e.g., RSUs) assigned to receive, generate, process, and/or provide information associated with V2X communication, as described herein. For example, RSU 120 may include a server device or a group of server devices. RSU 120 may be configured and/or positioned along a roadway to permit communication with VRU device 110 and ECUs 132 of vehicles 130. In some aspects, RSU 120 may be a device of a V2X communication platform that may be implemented within or by a cloud computing environment that receives vehicle data, via V2X communications associated with vehicles 130, distributes the vehicle data to other vehicles 130 (e.g., vehicles coupled to RSUs of the V2X communication platform), the VRU device 110, and/or the like.

Vehicle 130 may include any vehicle that is capable of transmitting and/or receiving V2X communications, as described herein. For example, vehicle 130 may be a consumer vehicle, an industrial vehicle, a commercial vehicle, and/or the like. Vehicle 130 may be capable of traveling and/or providing transportation via public roadways, may be capable of use in operations associated with a worksite (e.g., a construction site), and/or the like. Vehicle 130 may include a sensor system that includes one or more sensors that are used to generate and/or provide vehicle data (e.g., to VRU device 110 and/or to RSU 120) associated with vehicle 130.

A vehicle 130 may be controlled by TCU 132, which may include one or more devices capable of receiving, generating, storing, processing, and/or providing information associated with V2X communication management described herein. For example, TCU 132 may include and/or be a component of a communication and/or computing device, such as, an ECU, an onboard computer, a control console, an operator station, or a similar type of device. In some aspects, TCU 132 may include and/or be used to provide V2X communication, vehicle data associated with vehicle 130 (e.g., identification information, sensor data, and/or the like), as described herein. For example, the TCU 132 may permit the vehicle 130 to have one or more onboard capabilities associated with sharing vehicle information associated with the vehicle, as described herein, with VRU device 110 and/or RSU 120.

Network 140 includes one or more wired and/or wireless networks. For example, network 140 may include a peer-to-peer (P2P) network, a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some aspects, network 140 may include and/or be a P2P communication link that is directly between one or more of the devices of environment 100.

The number and arrangement of devices and networks shown in FIG. 1 are provided as one or more examples. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
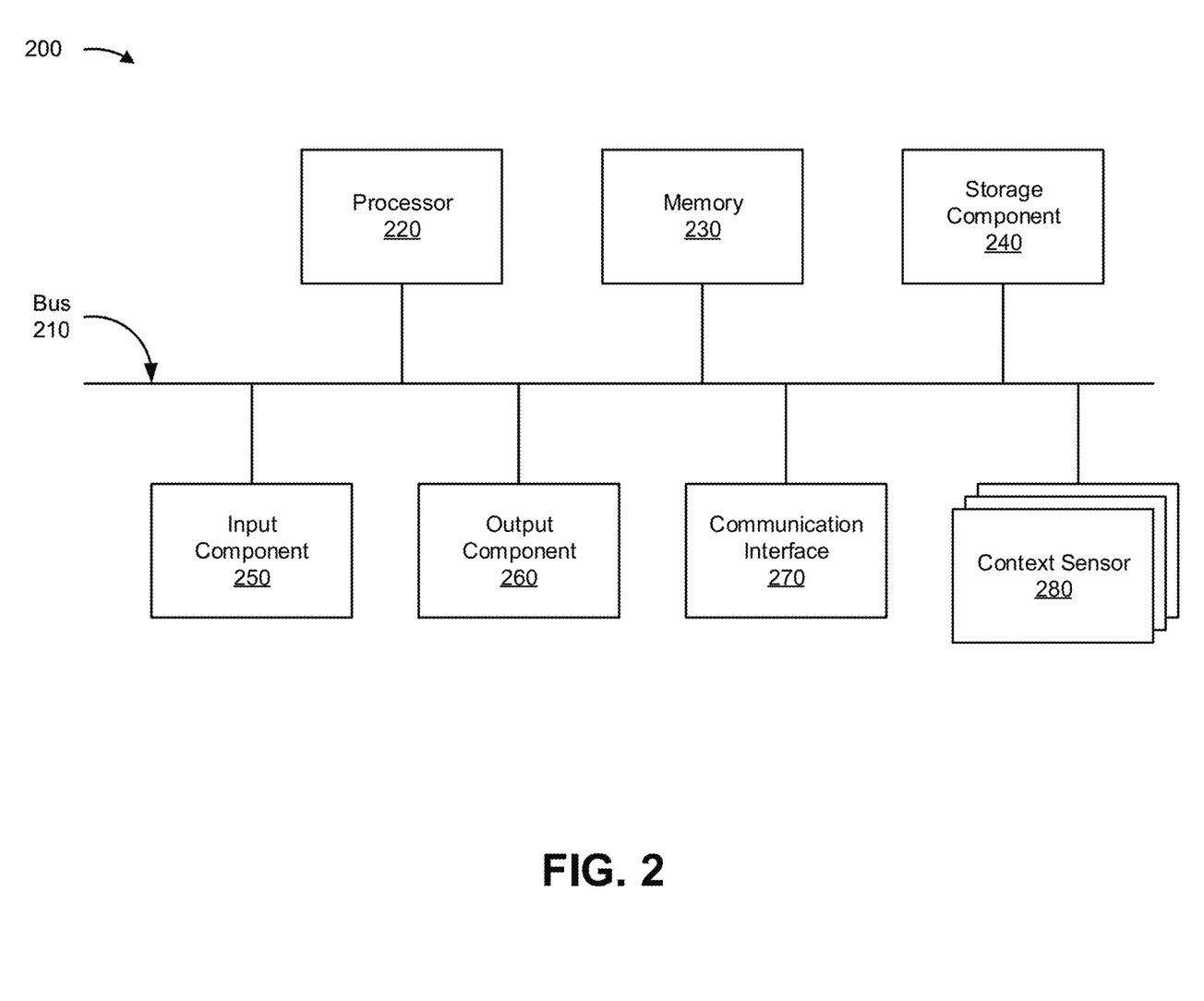
FIG. 2 is a diagram conceptually illustrating example components of one or more devices shown in FIG. 1, such as a VRU device, in accordance with various aspects of the present disclosure.

FIG. 2 is a diagram of example components of a device 200. Device 200 may correspond to VRU device 110, RSU 120, TCU 132, and/or the like. In some aspects, VRU device 110, RSU 120, and/or TCU 132 may include one or more devices 200 and/or one or more components of device 200. As shown in FIG. 2, device 200 may include a bus 210, a processor 220, a memory 230, a storage component 240, an input component 250, an output component 260, a communication interface 270, and one or more context sensors 280 (referred to herein individually as "context sensor 280", and collectively as "context sensors 280").

Bus 210 includes a component that permits communication among multiple components of device 200. Processor 220 is implemented in hardware, firmware, and/or a combination of hardware and software. Processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 220 includes one or more processors capable of being programmed to perform a function. Memory 230 includes a random access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 250 includes a component that permits device 200 to receive information, such as via user input (e.g., a touch screen display, a keyboard, a keypad, a mouse, a button, a switch, a microphone, a camera, and/or the like). Additionally, or alternatively, input component 250 may include a component for determining location (e.g., a global positioning system (GPS) component) and/or a sensor (e.g., an accelerometer, a gyroscope, an actuator, another type of positional or environmental sensor, and/or the like). Output component 260 includes a component that provides output information from device 200 (via, e.g., a display, a speaker, a haptic feedback component, an audio or visual indicator, and/or the like).

Communication interface 270 includes a transceiver-like component (e.g., a transceiver, a separate receiver, a separate transmitter, and/or the like) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, and/or the like.

Device 200 may perform one or more processes described herein. Device 200 may perform these processes based at least in part on processor 220 executing software instructions stored by a non-transitory computer-readable medium, such as memory 230 and/or storage component 240. As used herein, the term "computer-readable medium" refers to a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein. Additionally, or alternatively, hardware circuitry may be used in place of or in combination with software instructions to perform one or more processes described herein. Thus, aspects described herein are not limited to any specific combination of hardware circuitry and software.

Context sensor 280 includes one or more devices capable of receiving, detecting, analyzing, processing, and/or providing information associated with one or more characteristics of an environment of device 200 (e.g., an environment of a VRU). For example, as described herein, context sensor 280 may be configured to determine a time, a visibility measure, an ambient noise level, a speed of an object, a presence of an object, a physical characteristic of an object, a type of an object, a direction of travel, and/or the like. Such information may be determined based at least in part on sensor data (e.g., associated with sensors of input component 250), communications (e.g., from other devices), and/or the like.

In some aspects, device 200 includes means for performing one or more processes described herein and/or means for performing one or more operations of the processes described herein. For example, the means for performing the processes and/or operations described herein may include bus 210, processor 220, memory 230, storage component 240, input component 250, output component 260, communication interface 270, context sensor 280, and/or any combination thereof.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3A:
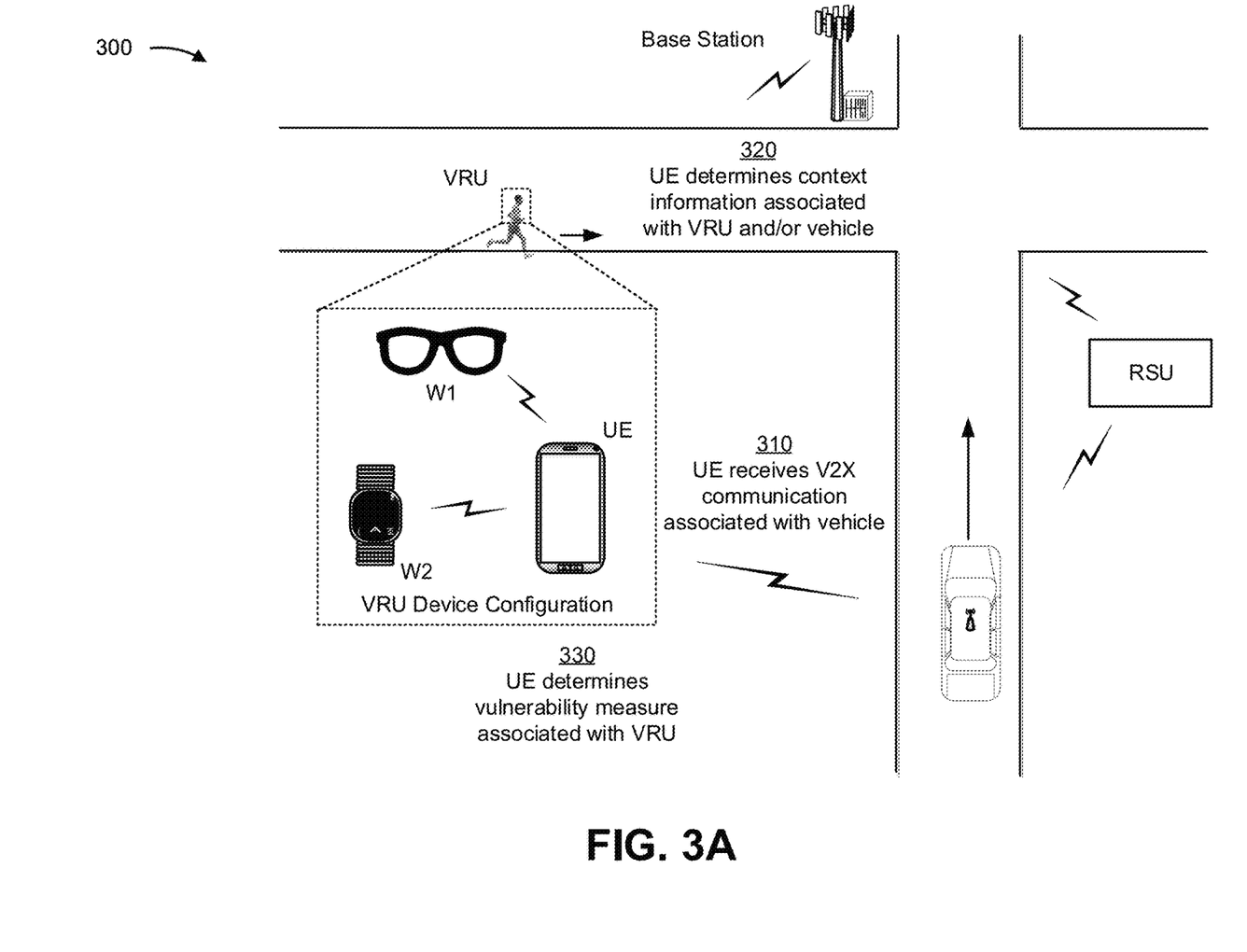
FIGS. 3A-3C and 4 are diagrams conceptually illustrating one or more examples associated with V2X communication management, in accordance with various aspects of the present disclosure.
Figure 3B:
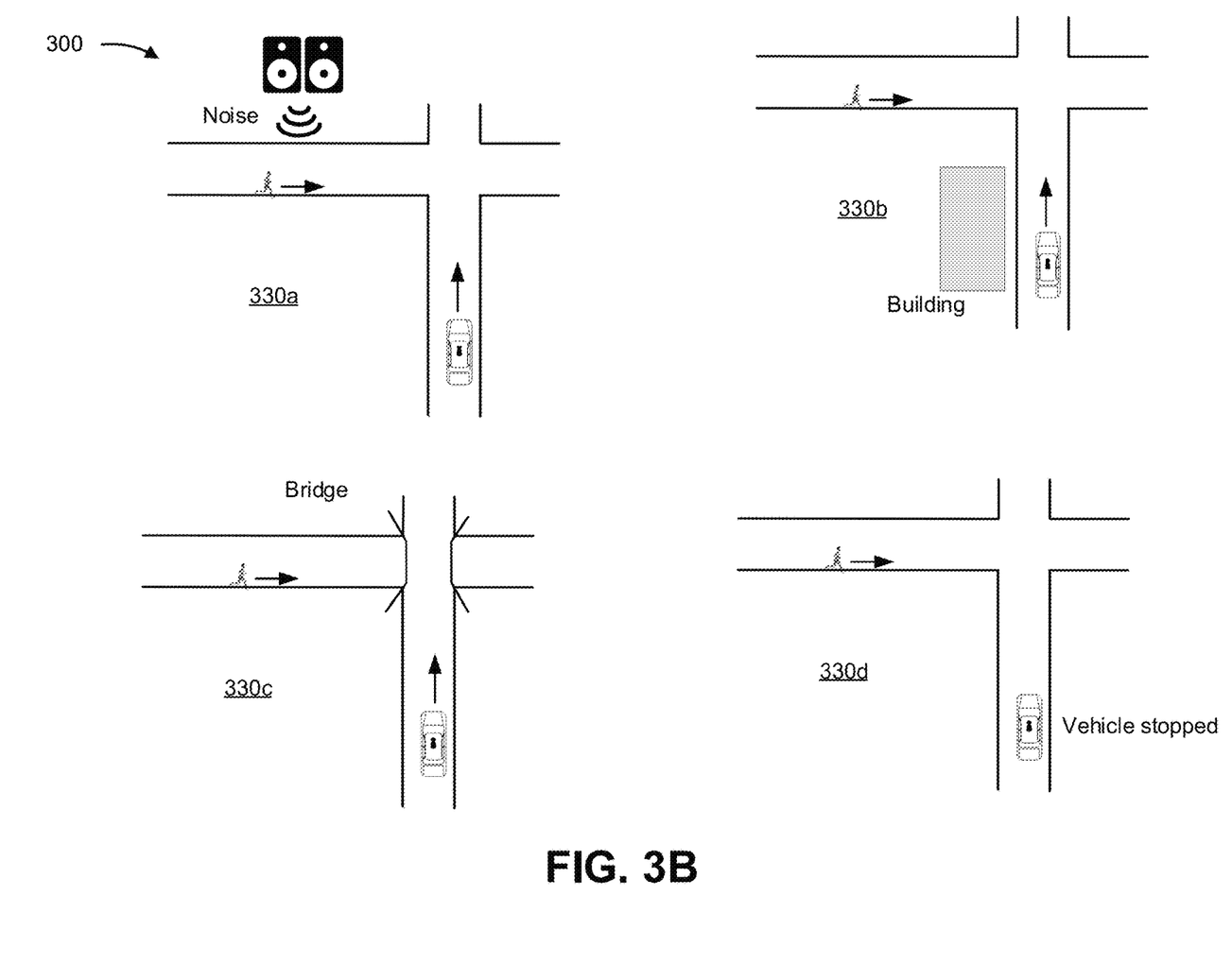
Figure 3C:
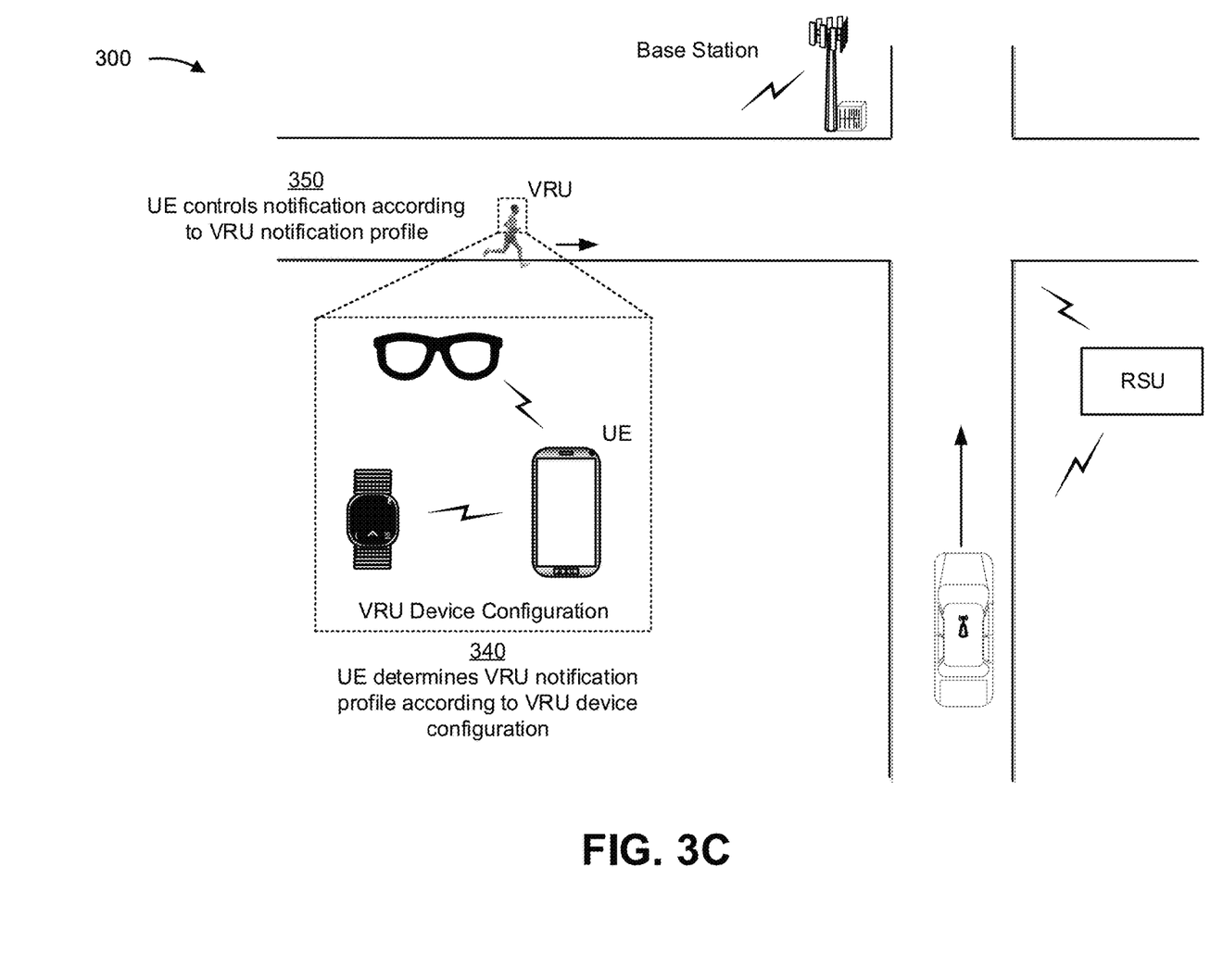

FIGS. 3A-3C are diagrams conceptually illustrating an example 300 associated with V2X communication management in accordance with various aspects of the present disclosure. Example 300 includes a VRU device configuration of a VRU (e.g., that includes one or more VRU devices 110), a vehicle (e.g., vehicle 130), a base station (e.g., a base station of network 140), and an RSU (e.g., RSU 120). In example 300, the vehicle and the VRU may be approaching a same roadway intersection.

In example 300, the VRU may be carrying and/or wearing a plurality of VRU devices that make up the VRU device configuration. More specifically, as shown, the VRU may be carrying a primary VRU device (shown as and referred to herein as "UE") and a set of secondary VRU devices (shown as smart glasses "W1" (or augmented reality glasses) and a smartwatch "W2," which are referred to herein collectively as "wearable devices"). Accordingly, the VRU device configuration may be utilized, via one or more output components of the devices of the VRU device configuration, to notify the VRU that the vehicle is approaching the intersection. The VRU device configuration is provided as an example, and may include more devices, fewer devices, and/or different devices than those described in connection with example 300.

As shown in FIG. 3A, and by reference number 310, the UE receives a V2X communication associated with the vehicle. For example, the V2X communication may be received from the vehicle and/or the RSU using any suitable V2X communication protocol. Accordingly, the V2X communication may be received by the UE based at least in part on the UE being within a communication range of the vehicle and/or the RSU. Additionally, or alternatively, the V2X communication may be received by the UE based at least in part on the UE being within a threshold distance of the vehicle (e.g., based at least in part on the vehicle and/or the RSU determining that the UE is within the threshold distance). As described herein, when referring to the vehicle performing an action in association with a V2X communication (e.g., sending/receiving V2X communications, processing V2X communications, and/or the like), it is to be understood that an ECU (e.g., TCU 132) of the vehicle may be performing the action.

As described herein, the V2X communication may include vehicle data associated with the vehicle. For example, the vehicle data may include information that identifies at least one of a location of the vehicle (e.g., geographical coordinates, altitude information, and/or the like), a speed of the vehicle, a direction of travel of the vehicle (e.g., heading information, navigation information, and/or the like), identification information of the vehicle (e.g., a vehicle identifier, a make/model of the vehicle, and/or the like), and/or the like. According to some aspects, the vehicle data may identify a type of the vehicle to indicate one or more performance capabilities of the vehicle. More specifically, the vehicle data may represent V2X communication capabilities (e.g., whether the vehicle is a connected V2X (C-V2X) enabled vehicle), autonomous control capabilities (e.g., whether the vehicle is an autonomous vehicle, a semi-autonomous vehicle, and/or the like), sensing capabilities (e.g., whether the vehicle includes certain types of sensors, has certain sensor systems, has an ability to detect certain objects, and/or the like), and/or the like.

In this way, the UE may receive a V2X communication associated with the vehicle to permit the UE to determine whether to share vehicle data with the VRU (e.g., using one or more output components of the UE and/or the wearable devices).

As further shown in FIG. 3A, and by reference number 320, the UE determines context information associated with the VRU and/or the vehicle. For example, the UE, via one or more sensors associated with the UE and/or the wearable devices, determines one or more characteristics of the environment (e.g., an environment that includes the VRU, the vehicle, the intersection, and/or the like), one or more characteristics of the VRU, and/or one or more characteristics of the vehicle. As described herein, based at least in part on the context information, the UE may determine a probability or a likelihood that the VRU is aware of the vehicle, that a driver of the vehicle is aware of the VRU, that the VRU and/or the vehicle may collide, and/or the like.

The UE may determine context information associated with the vehicle based at least in part on vehicle data received in the V2X communication (e.g., location, speed, direction of travel, vehicle capabilities, and/or the like). To obtain or determine context information associated with the environment, the UE may use sensors of the UE and/or sensors of the wearable devices that are associated with one or more characteristics of an environment. For example, the UE may use a clock to determine a time of day, a camera or light sensor to determine an amount of ambient light in the environment, a microphone to determine an ambient noise level in the environment, and/or the like. Additionally, or alternatively, the UE may determine context information associated with the environment based at least in part on receiving and/or processing data associated with one or more applications of the UE. For example, the UE may use a weather application to obtain weather information associated with the environment, a vehicle traffic or navigation application to obtain traffic density information associated with the environment, a mapping application to obtain roadside obstruction information (e.g., based at least in part on mapped buildings, mapped terrain and/or the like), and/or the like. In some aspects, the UE may obtain information associated with the environment from the RSU. For example, the RSU may broadcast and/or provide information (e.g., within and/or in association with a V2X communication) associated with the environment, such as the traffic density, a pedestrian density, visibility information, and/or the like.

The UE may determine context information associated with the VRU using one or more sensors or systems of the UE and/or the wearable devices. For example, the UE may determine a speed of the VRU using a pedometer (e.g., which may include an accelerometer) and/or a GPS component, a direction of travel of the VRU using a compass or GPS component, a health characteristic of the VRU using a heart rate monitor or other biometric monitoring sensor, and/or the like. The UE may determine context information associated with the VRU based at least in part on one or more user inputs to the UE. For example, the UE may determine whether the VRU is exercising (e.g., walking, running, cycling, and/or the like), has a certain mobility characteristic (e.g., uses a wheelchair or other mobility assistance device), has a certain health condition (e.g., a hearing disability, a seeing disability, and/or the like), is a certain age, and/or the like based at least in part on the user providing one or more inputs to a fitness and/or health application.

Accordingly, the UE may use any or all of the above context information and/or other similar types of information to correspondingly determine a probability that the VRU can hear the vehicle (e.g., using ambient noise level and/or other information), a probability that the VRU can see the vehicle and/or that a driver of the vehicle can see the VRU (e.g., using location information, roadside obstruction information, and/or the like), and/or the like.

In this way, the UE may determine context information associated with the VRU and/or the vehicle to permit the UE to determine a vulnerability measure associated with the VRU.

As further shown in FIG. 3A, and by reference number 330, the UE determines a vulnerability measure associated with the VRU. For example, the UE may determine the vulnerability measure based at least in part on the context information. The vulnerability measure may represent a level of vulnerability of the VRU and/or a degree of severity of a developing situation involving the VRU and the vehicle. The vulnerability measure may be based at least in part on determining a probability that the VRU is aware of the vehicle, a probability that a driver of the vehicle is aware of the VRU, a probability that the VRU and the vehicle may collide, and/or the like.

The one or more probabilities may be determined based at least in part on values associated with the context information. For example, if the context information indicates that an obstruction is between the VRU and the vehicle (e.g., the line of sight is blocked) and there is a relatively high level of ambient noise, then the UE may determine that there is a relatively higher likelihood that the VRU is unaware of the vehicle than if the environment is relatively quiet and/or there is no obstruction between the VRU and the vehicle (e.g., because the VRU would like hear and/or see the vehicle). According to some aspects, the RSU may notify the UE that the vehicle is approaching the intersection if the vehicle is not a C-V2X vehicle. For example, based on a camera and/or sensor associated with the RSU detecting the vehicle and/or based on a message, location information, and/or navigation information provided to the RSU by a user device carried by the vehicle, RSU can determine that the vehicle is approaching the intersection. In such an example, if the vehicle is not a C-V2X vehicle, which can be communicated by the RSU, then the UE may determine that there is a relatively higher likelihood that the driver of the vehicle is unaware of the VRU than if the vehicle is a C-V2X vehicle (e.g., because a driver of a C-V2X vehicle would be made aware of the VRU via a V2X communication from the RSU and/or UE). Furthermore, based at least in part on respective location, speed, and direction of travel information of the VRU and the vehicle, the UE can determine a probability that the VRU and the vehicle would collide.

According to some aspects, the UE can utilize a vulnerability scoring system to determine the vulnerability measure (and/or the one or more probabilities) associated with the VRU and the vehicle based at least in part on the context information. For example, using such a scoring system, the UE can apply weights (w) to one or more vulnerability parameters associated with the context information. The weights may be based at least in part on a relevant impact that the individual vulnerability parameters have on a potential collision (or other hazardous scenario) between the VRU and the vehicle (e.g., a relevance of VRU awareness to a potential collision, a relevance of vehicle driver awareness to a potential collision, a relevance of travel paths of the VRU and the vehicle overlapping at the same time, and/or the like).

More specifically, assuming three vulnerability parameters that include a visibility measure between the VRU and vehicle, an audibility measure of the environment, and a mobility measure corresponding to a current or estimated future distance between the VRU and the vehicle, the UE can use the following to determine the vulnerability measure ($s_{ij}$) based at least in part on the three vulnerability parameters, represented as a, b, c of a vehicle (i) for a VRU j:

$$s_{ij}=w_{aj}a_i+w_{bj}b_i+w_{cj}c_i+ \ldots \qquad (1)$$

where $w_{aj}$, $w_{bj}$, $w_{cj}$ corresponds to adjusted weights based at least in part on the relevance to the VRU j for vulnerability parameters $a_i$, $b_i$, $c_i$, which correspond to values specifically for the vehicle i. According to the above, if the VRU is relatively immobile, more weight may be given to a mobility measure than the visibility measure or the audibility measure to cause the vulnerability measure to indicate a relatively higher degree of vulnerability than if all three were weighted equally. In some aspects, the weights $w_{aj}$, $w_{bj}$, $w_{cj}$ may be normalized (e.g., where $0 \leq w_{aj}$, $w_{bj}$, $w_{cj} \leq 1$ and $w_{aj}+w_{bj}+w_{cj}=1$).

In some aspects, the UE may use and/or be associated with a machine learning model, such as a vulnerability model, to determine the vulnerability measure. For example, the UE may train the vulnerability model based on one or more vulnerability parameters associated with determining whether a VRU is vulnerable to a vehicle, such as a visibility measurement, a audibility measurement, a distance between the VRU and the vehicle, an awareness level or capability of the VRU, an awareness level or capability of a driver of the vehicle, a speed of the VRU, a speed of the vehicle, a direction of travel of the VRU, a direction of travel of the vehicle, a location of the VRU, a location of the vehicle, a time of day, a time of year, a weather characteristic, a vehicle capability or type, and/or the like. The vulnerability model may be trained using historical data associated with determining whether a VRU is vulnerable to a vehicle according to the one or more vulnerability parameters. Using the historical data and corresponding context information associated with the VRU and/or the vehicle (e.g., corresponding context information for the vulnerability parameters) as inputs to the vulnerability model, the UE may determine the vulnerability measure to determine a VRU notification profile and/or whether a notification associated with the vehicle is to be sent to (or rendered for) the VRU.

FIG. 3B shows example scenarios 330a-330d associated with example 300. In example scenario 330a, the VRU is near speakers that are emitting loud noise. In such a scenario, the UE may obtain and/or determine (e.g., from a microphone of the UE) context information that indicates that there is a high level of ambient noise around the VRU. In such a case, the UE may determine a vulnerability measure that indicates that the VRU is vulnerable to the vehicle (e.g., because the VRU likely cannot hear the vehicle).

In example scenario 330b, there is a building blocking a line of sight between the VRU and the vehicle. In such a scenario, the UE may obtain and/or determine context information that indicates that the building is between the VRU and the vehicle (e.g., using location information, mapping information, and/or the like). In such a case, the UE may determine a vulnerability measure that indicates that the VRU is vulnerable to the vehicle (e.g., because the VRU likely cannot see the vehicle).

In example scenario 330c, the intersection includes a bridge, such that the vehicle will pass over the roadway of the VRU. In such a scenario, the UE may obtain and/or determine context information that indicates that the VRU and the vehicle are not approaching a same location and/or cannot collide (e.g., using location and/or altitude information, mapping information, and/or the like). In such a case, based at least in part on the vehicle likely not being within the intersection at the same time as the VRU, the UE may determine a vulnerability measure that indicates that the VRU is not vulnerable to the vehicle.

In example scenario 330d, the vehicle has (or is) stopped. In such a scenario, the UE may obtain and/or determine context information that indicates that the vehicle is stopped (e.g., from the V2X communication). In such a case, based at least in part on the vehicle likely not being within the intersection at the same time as the VRU, the UE may determine that a vulnerability measure that indicates that the VRU is not vulnerable to the vehicle.

In this way, the UE may determine, from the context information, a vulnerability measure to permit the UE to determine a VRU notification profile for notifying the VRU via one or more output components of the VRU device configuration.

As shown in FIG. 3C, and by reference number 340, the UE determines a VRU notification profile according to the VRU device configuration. The VRU notification profile may be selected based at least in part on the vulnerability measure and/or indicate whether the VRU is to be notified that the V2X communication was received and/or provide vehicle information associated with the vehicle data of the V2X communication (e.g., to indicate the location of the vehicle, the speed of the vehicle, the direction of travel of the vehicle, and/or the like). For example, if the VRU is determined to be vulnerable (e.g., there is a threshold probability that the VRU and the vehicle reach the intersection at the same time), the VRU may determine that the VRU is to receive a notification associated with the vehicle and/or received V2X communication. If the UE determines a vulnerability measure that indicates that the VRU is not vulnerable to the vehicle (though the VRU may be vulnerable to other vehicles), the UE may continue to monitor V2X communications associated with the vehicle (e.g., in case the UE determines from one of the V2X communications that the VRU is vulnerable to the vehicle).

In some aspects, when the VRU is to be notified that the V2X communication was received, the VRU notification may be determined and/or configured to represent which output components of the VRU devices in the VRU device configuration are to be used to send notifications (e.g., messages, alerts, warnings, and/or the like) to the VRU. Additionally, or alternatively, the VRU notification profile may indicate a frequency and/or a pattern associated with sending the notifications via the one or more output components.

The UE may determine a VRU user interface configuration associated with the VRU based at least in part on the VRU devices (e.g., the quantity and/or types) in the VRU device configuration. The VRU user interface configuration may identify any or all activatable output components of the VRU devices of the VRU device configuration. In example 300, the activatable output components may include a display, a speaker, and a haptic feedback component of the UE, a display, a speaker, and a haptic feedback component of the smartwatch, and a display and a speaker of the smart glasses.

The UE may determine the VRU user interface configuration based at least in part on which of the output components of the VRU devices are activatable. For example, the UE may determine which of the output components of the UE are activatable (e.g., according to a setting of the UE and/or preferences of the UE) and which of the output components of the wearable devices are activatable (e.g., according to one or more messages or communications that identify an availability of respective output components of the wearable components). In some aspects, the UE may determine that one or more settings of the output components can be overridden according to a certain vulnerability measure (e.g., if the UE is in a silent mode, a speaker may be activated for a vulnerability measure associated with a critical condition).

According to some aspects described herein, when the UE determines that the VRU is to be notified of the vehicle, the UE may select one or more of the output components for the VRU notification profile. The selected device may be based at least in part on a priority scheme associated with the types of the devices and/or preferences of the VRU. For example, the priority scheme may prioritize sending a notification via a wearable device over the UE. Additionally, or alternatively, the priority scheme may specify that a particular wearable device is to be prioritized over another wearable device (the smart glasses is to be prioritized over the smart watch), that a particular type of wearable device is to be prioritized over another type of wearable device (e.g., any set of smart glasses of the VRU is to be prioritized over a smartwatch) of the VRU.

In some aspects, the priority scheme for selecting which output component of the VRU devices in the VRU device configuration are to be used for a notification may be based at least in part on the vulnerability measure. For example, the UE may select an output component of one or more wearable devices over an output component of the UE to notify the VRU when the UE determines a relatively critical or major vulnerability measure that indicates that the VRU is likely (e.g., more than a threshold probability) vulnerable to the vehicle (e.g., because the VRU may be more likely to receive the notification by an output component of a wearable device than an output component of the UE). On the other hand, for less critical or minor vulnerability measures that indicate that the VRU is not likely vulnerable (e.g., less than a threshold probability) to the vehicle, the UE may select an output component of the UE (e.g., to provide information associated with the vehicle but to avoid the likelihood of distracting the VRU).

In this way, the UE may determine a VRU notification profile to permit the UE to notify the VRU (e.g., send a notification and/or cause a notification to be rendered) via one or more output components of the UE and/or wearable devices.

As further shown in FIG. 3C, and by reference number 350, the UE controls notification(s) according to the VRU notification profile. For example, the UE may render one or more notifications (e.g., displayed content, messages, sounds, vibrations, and/or the like) via one or more output components of the UE and/or cause the wearable devices to render one or more notifications via respective one or more output components of the wearable components.

In some aspects, the UE may select a VRU notification profile that is to block one or more notifications that are configured to be sent according to the V2X communication. For example, the vehicle may send the V2X communication to notify the VRU that the vehicle is within a threshold distance of the VRU (e.g., without the context information that is available to the VRU and/or described herein). In such a case, the UE may ignore and/or block V2X communications associated with the vehicle (e.g., because the UE determined that the VRU is not vulnerable to the vehicle).

In this way, one or more of the VRU devices described in connection with example 300 may be used to selectively notify a VRU that a V2X communication was received in a selective manner, based at least in part on contextual information and/or a VRU device configuration of the VRU. Accordingly, the one or more VRU devices described herein may conserve computing and/or communication resources associated with irrelevant V2X communications (e.g., V2X communications associated with vehicles that are not relevant to the VRU) and/or improve a user experience associated with receiving notifications regarding V2X communications (e.g., by improving the likelihood that the VRU receives critical notifications without being distracted by unnecessary or irrelevant notifications).

As indicated above, FIGS. 3A-3C are provided merely as one or more examples. Other examples may differ from what is described with regard to FIGS. 3A-3C.

Figure 4:
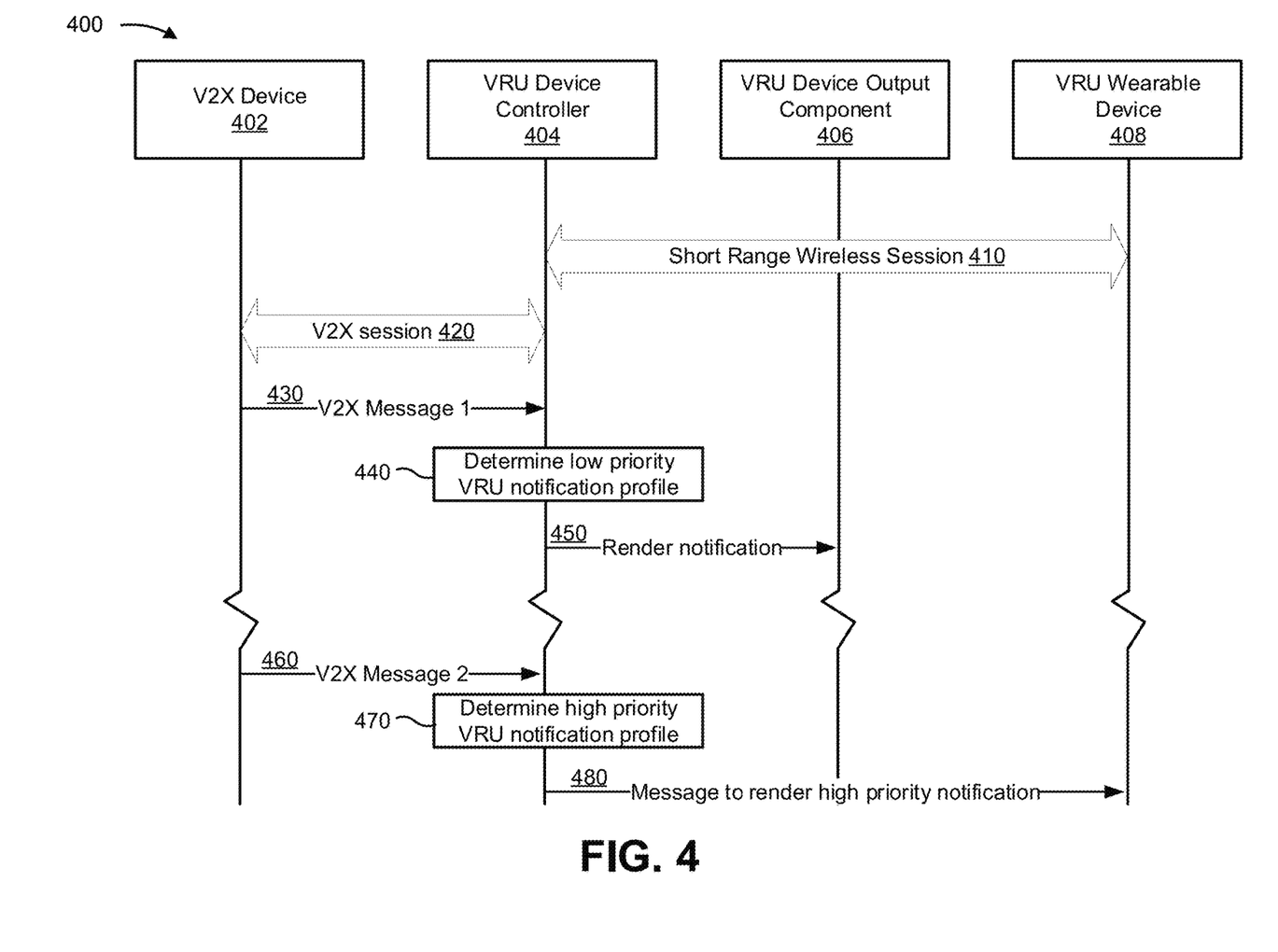

FIG. 4 is a diagram conceptually illustrating an example 400 associated with V2X communication management, in accordance with various aspects of the present disclosure. Example 400 includes a call flow involving a V2X device 402 (e.g., the RSU and/or the vehicle of example 300), a VRU device controller 404 (e.g., processor 220, a processor of the UE of example 300, and/or the like), a VRU device output component 406 (e.g., a display, speaker, or haptic component of the UE), and a VRU wearable device 408 (e.g., the smart glasses and/or smartwatch of example 300).

As shown by reference number 410, a short range wireless communication session (e.g., a BLUETOOTH® communication session, a BLUETOOTH LOW-ENERGY® (BLE) communication session, a Wi-Fi communication session, and/or the like) is established between VRU device controller 404 and VRU wearable device 408. As shown by reference number 420, a V2X session is established between the VRU device controller 404 and the V2X device 402.

In example 400, VRU device controller 404 receives a first V2X message ("V2X Message 1") from V2X device 402, as shown by reference number 430. VRU device controller 404, as shown by reference number 440, may determine, according to some aspects described herein, that a low priority VRU notification profile (e.g., which may be associated with a vulnerability measurement associated with relatively low risk to a VRU) is to be used to send a notification associated with the first V2X message. As shown by reference number 450, VRU device controller 404 may render a notification via the VRU device output component 406 (e.g., to provide information, such as vehicle data, associated with the first V2X message).

As further shown in FIG. 4 and by reference number 460, in example 400, VRU device controller 404 receives a second V2X message ("V2X Message 1") from V2X device 402. As shown by reference number 470, VRU device controller 404 may determine, according to some aspects described herein, that a high priority VRU notification profile (e.g., which may be associated with a vulnerability measurement associated with relatively high risk to a VRU) is to be used to send a notification associated with the second V2X message. As shown by reference number 480, VRU device controller 404 may send a message to VRU wearable device 408 to permit VRU wearable device 408 to render a notification via an output component of VRU wearable device 408 (e.g., to alert the VRU, to warn the VRU, and/or the like).

As indicated above, FIG. 4 is provided as one or more examples. Other examples may differ from what is described with regard to FIG. 4.

Figure 5:
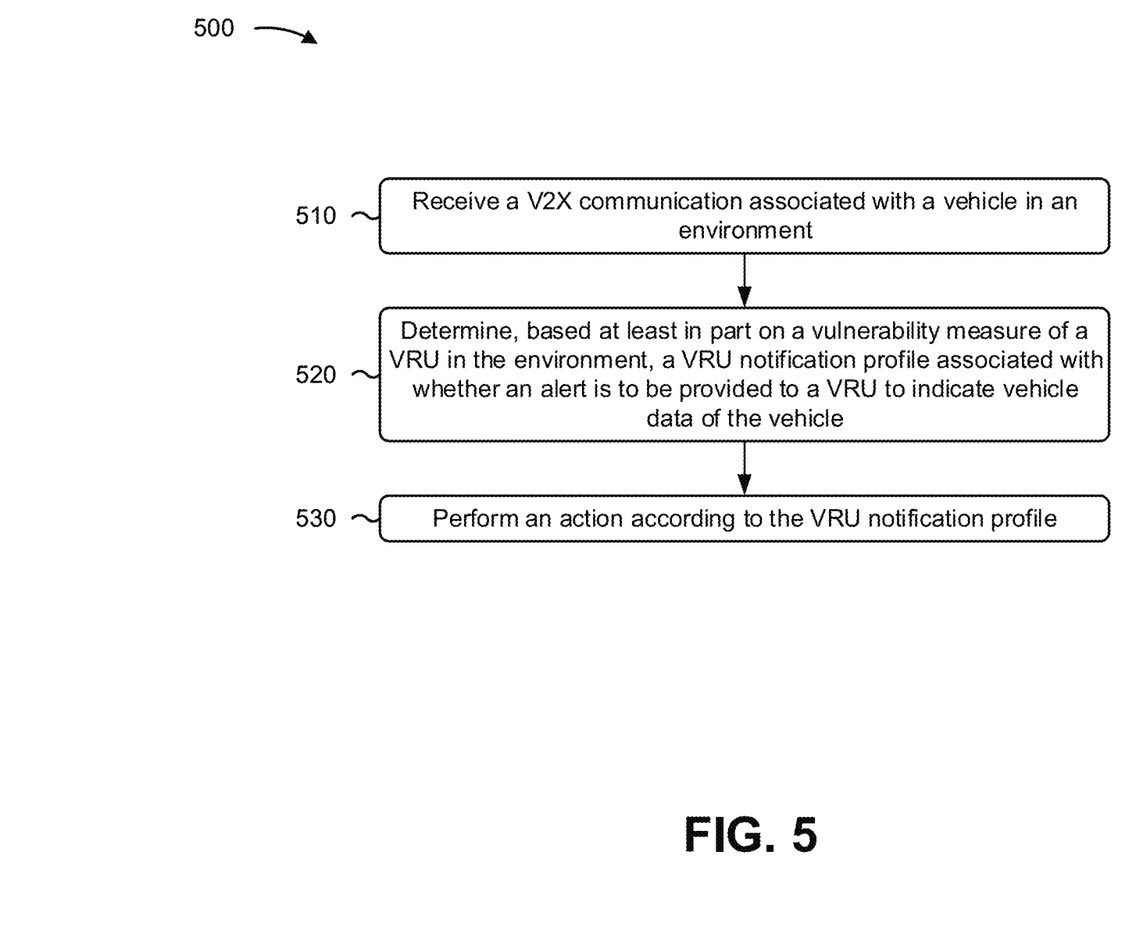
FIG. 5 is a flowchart of an example process associated with V2X communication management according to a VRU device configuration, in accordance with various aspects of the present disclosure.

FIG. 5 is a diagram illustrating an example process 500 performed, for example, by a VRU device, in accordance with various aspects of the present disclosure. Example process 500 is an example where the VRU device (e.g., VRU device 110 and/or the like) performs operations associated with V2X communication management according to a VRU device configuration.

As shown in FIG. 5, in some aspects, process 500 may include receiving a V2X communication associated with a vehicle in an environment (block 510). For example, the VRU device (e.g., using processor 220, memory 230, storage component 240, input component 250, output component 260, communication interface 270, context sensor 280, and/or the like) may receive a V2X communication associated with a vehicle in an environment, as described above.

As further shown in FIG. 5, in some aspects, process 500 may include determining, based at least in part on a vulnerability measure of a VRU in the environment, a VRU notification profile associated with whether an alert is to be provided to a VRU to indicate vehicle data of the vehicle (block 520). For example, the VRU device (e.g., using processor 220, memory 230, storage component 240, input component 250, output component 260, communication interface 270, context sensor 280, and/or the like) may determine, based at least in part on a vulnerability measure of a VRU in the environment, a VRU notification profile associated with whether an alert is to be provided to a VRU to indicate vehicle data of the vehicle, as described above.

As further shown in FIG. 5, in some aspects, process 500 may include performing an action according to the VRU notification profile (block 530). For example, the VRU device (e.g., using processor 220, memory 230, storage component 240, input component 250, output component 260, communication interface 270, context sensor 280, and/or the like) may perform an action according to the VRU notification profile, as described above.

Process 500 may include additional aspects, such as any single aspect or any combination of aspects described below and/or in connection with one or more other processes described elsewhere herein.

In a first aspect, the V2X communication is received from at least one of the vehicle or a roadside unit in the environment. In a second aspect, alone or in combination with the first aspect, the V2X communication identifies at least one of: a location of the vehicle, a speed of the vehicle, a direction of travel of the vehicle, or a type of the vehicle.

In a third aspect, alone or in combination with one or more of the first and second aspects, the vulnerability measure is determined based at least in part on at least one of: information in the V2X communication, or information obtained from a sensor of the device. In a fourth aspect, alone or in combination with one or more of the first through third aspects, the vulnerability measure is determined based at least in part on at least one of: timing associated with receiving the V2X communication, a visibility measure of the environment, a traffic density of the environment, an ambient noise level of the environment, whether the vehicle is autonomous, whether there is a clear line of sight between the vehicle and the VRU, a mobility characteristic of the VRU, a speed of the VRU, or a direction of travel of the VRU.

In a fifth aspect, alone or in combination with one or more of the first through fourth aspects, determining the VRU notification profile comprises: determining, according to the vulnerability measure, that an alert is to be provided to the VRU; determining a VRU user interface configuration associated with the VRU; selecting a user interface, from a plurality of user interfaces of the VRU user interface configuration, of the VRU user interface configuration to warn the VRU of the vehicle; generating the alert for rendering via the user interface, and assigning the alert to the VRU notification profile, performing the action comprises: causing the user interface to render the alert.

In a sixth aspect, alone or in combination with one or more of the first through fifth aspects, the VRU user interface configuration is determined based at least in part on identifying at least one of: activatable output components associated with the device, or activatable output components associated with a wearable device that is communicatively coupled with the device and associated with the VRU.

In a seventh aspect, alone or in combination with one or more of the first through sixth aspects, the user interface comprises at least one of: a display of a wearable device, a haptic component of the wearable device, a speaker of the wearable device, a display of the device, a haptic component of the device, or a speaker of the device.

In an eighth aspect, alone or in combination with one or more of the first through seventh aspects, the user interface is selected based at least in part on the vulnerability measure and the VRU user interface configuration. In a ninth aspect, alone or in combination with one or more of the first through eighth aspects, the user interface is selected based at least in part on a priority scheme associated with the plurality of user interfaces.

In a tenth aspect, alone or in combination with one or more of the first through ninth aspects, the priority scheme is configured to weight the plurality of user interfaces based at least in part on at least one of: the vulnerability measure, a quantity of the plurality of user interfaces, individual types of the plurality of user interfaces, or individual types of devices associated with the plurality of user interfaces.

In an eleventh aspect, alone or in combination with one or more of the first through tenth aspects, the V2X communication is a first V2X communication, the user interface is a first user interface, and the alert is a first alert, the method comprising: receiving a second V2X communication associated with the vehicle, and updating the VRU notification profile to include a second alert based at least in part on a change to the vulnerability measure according to information in the second V2X communication, performing the action comprises: causing a second user interface to render the second alert.

In a twelfth aspect, alone or in combination with one or more of the first through eleventh aspects, the updated VRU notification profile indicates that the first user interface is to render the first alert while the second user interface is to render the second alert. In a thirteenth aspect, alone or in combination with one or more of the first through twelfth aspects, the second user interface comprises the first user interface, and the updated VRU notification profile indicates that the first user interface is to render the second alert.

In a fourteenth aspect, alone or in combination with one or more of the first through thirteenth aspects, determining the VRU notification profile comprises: determining, according to the vulnerability measure, that an alert is not to be provided to the VRU in association with receiving the V2X communication, performing the action comprises at least one of: preventing a user interface from rendering the alert via a user interface, or monitoring subsequent V2X communications that are associated with the vehicle.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based at least in part on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, performed by a device, comprising:
   receiving, by a device, a vehicle to everything (V2X) communication associated with a vehicle in an environment;
   determining, by the device, a vulnerability measure of a vulnerable roadside user (VRU) in the environment based at least in part on one or more probabilities, wherein the one or more probabilities comprise one or more of a probability that the VRU is aware of the vehicle, a probability that a driver of the vehicle is aware of the VRU, or a probability that the VRU and the vehicle may collide;
   determining, by the device and based at least in part on the vulnerability measure, a VRU notification profile associated with whether an alert is to be provided to the VRU to indicate vehicle data of the vehicle; and
   performing, by the device, an action according to the VRU notification profile.

2. The method of claim 1, wherein the V2X communication is received from at least one of the vehicle or a roadside unit in the environment.

3. The method of claim 1, wherein the V2X communication identifies at least one of:
   a location of the vehicle,
   a speed of the vehicle,
   a direction of travel of the vehicle, or
   a type of the vehicle.

4. The method of claim 1, wherein the one or more probabilities are determined based at least in part on at least one of:
   information in the V2X communication, or
   information obtained from a sensor of the device.

5. The method of claim 1, wherein the one or more probabilities are determined based at least in part on at least one of:
   timing associated with receiving the V2X communication,
   a visibility measure of the environment,
   a traffic density of the environment,
   an ambient noise level of the environment,
   whether the vehicle is autonomous,
   whether there is a clear line of sight between the vehicle and the VRU,
   a mobility characteristic of the VRU,
   a speed of the VRU, or
   a direction of travel of the VRU.

6. The method of claim 1, wherein determining the VRU notification profile comprises:
   determining, according to the vulnerability measure, that the alert is to be provided to the VRU;
   determining a VRU user interface configuration associated with the VRU;
   selecting a user interface, from a plurality of user interfaces of the VRU user interface configuration, to warn the VRU of the vehicle;
   generating the alert for rendering via the user interface; and
   assigning the alert to the VRU notification profile,
      wherein performing the action comprises:
         causing the user interface to render the alert.

7. The method of claim 6, wherein the VRU user interface configuration is determined based at least in part on identifying at least one of:
   activatable output components associated with the device, or
   activatable output components associated with a wearable device that is communicatively coupled with the device and associated with the VRU.

8. The method of claim 6, wherein the user interface comprises at least one of:
   a display of a wearable device,
   a haptic component of the wearable device,
   a speaker of the wearable device,
   a display of the device,
   a haptic component of the device, or
   a speaker of the device.

9. The method of claim 6, wherein the user interface is selected based at least in part on the vulnerability measure and the VRU user interface configuration.

10. The method of claim 6, wherein the user interface is selected based at least in part on a priority scheme associated with the plurality of user interfaces.

11. The method of claim 10, wherein the priority scheme is configured to weight the plurality of user interfaces based at least in part on at least one of:
    the vulnerability measure,
    a quantity of the plurality of user interfaces,
    individual types of the plurality of user interfaces, or
    individual types of devices associated with the plurality of user interfaces.

12. The method of claim 6, wherein the V2X communication is a first V2X communication, the user interface is a first user interface, and the alert is a first alert, the method comprising:
    receiving a second V2X communication associated with the vehicle; and
    updating the VRU notification profile to include a second alert based at least in part on a change to the vulnerability measure according to information in the second V2X communication,
       wherein performing the action comprises:
          causing a second user interface to render the second alert.

13. The method of claim 12, wherein the updated VRU notification profile indicates that the first user interface is to render the first alert while the second user interface is to render the second alert.

14. The method of claim 12, wherein the second user interface comprises the first user interface, and the updated VRU notification profile indicates that the first user interface is to render the second alert.

15. The method of claim 1, wherein determining the VRU notification profile comprises:
    determining, according to the vulnerability measure, that an alert is not to be provided to the VRU in association with receiving the V2X communication,
       wherein performing the action comprises at least one of:
          preventing a user interface from rendering the alert via the user interface, or
          monitoring subsequent V2X communications that are associated with the vehicle.

16. A device, comprising:
    one or more memories; and
    one or more processors, communicatively coupled to the one or more memories, configured to:
       receive a vehicle to everything (V2X) communication associated with a vehicle in an environment;
       determine a vulnerability measure of a vulnerable roadside user (VRU) in the environment based at least in part on one or more probabilities, wherein the one or more probabilities comprise one or more of a probability that the VRU is aware of the vehicle, a probability that a driver of the vehicle is aware of the VRU, or a probability that the VRU and the vehicle may collide;

determine, based at least in part on the vulnerability measure, a VRU notification profile associated with whether an alert is to be provided to the VRU to indicate vehicle data of the vehicle; and perform an action according to the VRU notification profile.

17. The device of claim 16, wherein the one or more probabilities are determined based at least in part on at least one of:

information in the V2X communication, or information obtained from a sensor of the device.

18. The device of claim 16, wherein the one or more processors, when determining the VRU notification profile, are configured to:

determine, according to the vulnerability measure, that the alert is to be provided to the VRU;

determine a VRU user interface configuration associated with the VRU;

select a user interface, from a plurality of user interfaces of the VRU user interface configuration to warn the VRU of the vehicle;

generate the alert for rendering via the user interface; and assign the alert to the VRU notification profile, wherein the one or more processors, when perform the action, are configured to:

cause the user interface to render the alert.

19. The device of claim 18, wherein the VRU user interface configuration is determined based at least in part on identifying at least one of:

activatable output components associated with the device, or activatable output components associated with a wearable device that is communicatively coupled with the device and associated with the VRU.

20. The device of claim 16, wherein the one or more processors, when determining the VRU notification profile, are configured to:

determine, according to the vulnerability measure, that the alert is not to be provided to the VRU in association with receiving the V2X communication, wherein the one or more processors, when performing the action, are configured to at least one of:

prevent a user interface from rendering the alert via a user interface, or monitor subsequent V2X communications that are associated with the vehicle.

21. A non-transitory computer-readable medium storing instructions, the instructions comprising:

one or more instructions that, when executed by one or more processors of a device, cause the one or more processors to:

receive a vehicle to everything (V2X) communication associated with a vehicle in an environment;

determine a vulnerability measure of a vulnerable roadside user (VRU) in the environment based at least in part on one or more probabilities, wherein the one or more probabilities comprise one or more of a probability that the VRU is aware of the vehicle, a probability that a driver of the vehicle is aware of the VRU, or a probability that the VRU and the vehicle may collide;

determine, based at least in part on the vulnerability measure, a VRU notification profile associated with whether an alert is to be provided to the VRU to indicate vehicle data of the vehicle; and perform an action according to the VRU notification profile.

22. The non-transitory computer-readable medium of claim 21, wherein the one or more probabilities are determined based at least in part on at least one of:

information in the V2X communication, or information obtained from a sensor of the device.

23. The non-transitory computer-readable medium of claim 21, wherein the one or more instructions, that cause the one or more processors to determine the VRU notification profile, cause the one or more processors to:

determine, according to the vulnerability measure, that the alert is to be provided to the VRU;

determine a VRU user interface configuration associated with the VRU;

select a user interface, from a plurality of user interfaces of the VRU user interface configuration to warn the VRU of the vehicle;

generate the alert for rendering via the user interface; and assign the alert to the VRU notification profile, wherein the one or more instructions, that cause the one or more processors to perform the action, cause the one or more processors to:

cause the user interface to render the alert.

24. The non-transitory computer-readable medium of claim 23, wherein the VRU user interface configuration is determined based at least in part on identifying at least one of:

activatable output components associated with the device, or activatable output components associated with a wearable device that is communicatively coupled with the device and associated with the VRU.

25. The non-transitory computer-readable medium of claim 21, wherein the one or more instructions, that cause the one or more processors to determine the VRU notification profile, cause the one or more processors to:

determine, according to the vulnerability measure, that an alert is not to be provided to the VRU in association with receiving the V2X communication, wherein the one or more instructions, that cause the one or more processors to perform the action, cause the one or more processors to at least one of:

prevent a user interface from rendering the alert via a user interface, or monitor subsequent V2X communications that are associated with the vehicle.

26. An apparatus, comprising:

means for receiving, by a device, a vehicle to everything (V2X) communication associated with a vehicle in an environment;

means for determining a vulnerability measure of a vulnerable roadside user (VRU) in the environment based at least in part on one or more probabilities, wherein the one or more probabilities comprise one or more of a probability that the VRU is aware of the vehicle, a probability that a driver of the vehicle is aware of the VRU, or a probability that the VRU and the vehicle may collide;

means for determining, by the device and based at least in part on the vulnerability measure, a VRU notification profile associated with whether an alert is to be provided to the VRU to indicate vehicle data of the vehicle; and means for performing, by the device, an action according to the VRU notification profile.

27. The apparatus of claim 26, wherein the one or more probabilities are determined based at least in part on at least one of:

information in the V2X communication, or information obtained from a sensor of the device.

28. The apparatus of claim 26, wherein the means for determining the VRU notification profile comprises:

means for determining, according to the vulnerability measure, that an alert is to be provided to the VRU;

means for determining a VRU user interface configuration associated with the VRU;

means for selecting a user interface, from a plurality of user interfaces of the VRU user interface configuration, of the VRU user interface configuration to warn the VRU of the vehicle;

means for generating the alert for rendering via the user interface; and means for assigning the alert to the VRU notification profile, wherein performing the action comprises:

means for causing the user interface to render the alert.

29. The apparatus of claim 28, wherein the VRU user interface configuration is determined based at least in part on identifying at least one of:

activatable output components associated with the device, or activatable output components associated with a wearable device that is communicatively coupled with the device and associated with the VRU.

30. The apparatus of claim 26, wherein the means for determining the VRU notification profile comprises:

means for determining, according to the vulnerability measure, that the alert is not to be provided to the VRU in association with receiving the V2X communication, wherein performing the action comprises at least one of:

means for preventing a user interface from rendering the alert via the user interface, or means for monitoring subsequent V2X communications that are associated with the vehicle.

\* \* \* \* \*